US012108140B2

(12) United States Patent
Murarka

(10) Patent No.: US 12,108,140 B2
(45) Date of Patent: Oct. 1, 2024

(54) UPDATING ZOOM PROPERTIES OF CORRESPONDING SALIENT OBJECTS

(71) Applicant: Adobe Inc., San Jose, CA (US)

(72) Inventor: Ankur Murarka, Bangalore (IN)

(73) Assignee: Adobe Inc., San Jose, CA (US)

( * ) Notice: Subject to any disclaimer, the term of this patent is extended or adjusted under 35 U.S.C. 154(b) by 122 days.

(21) Appl. No.: 17/974,041

(22) Filed: Oct. 26, 2022

(65) Prior Publication Data

US 2024/0147048 A1 May 2, 2024

(51) Int. Cl.
*H04N 23/611* (2023.01)
*G06V 10/22* (2022.01)
*G06V 10/75* (2022.01)
*G06V 20/40* (2022.01)
*G06V 40/16* (2022.01)
*H04N 23/62* (2023.01)
*H04N 23/63* (2023.01)
*H04N 23/69* (2023.01)

(52) U.S. Cl.
CPC ......... *H04N 23/611* (2023.01); *G06V 10/225* (2022.01); *G06V 10/75* (2022.01); *G06V 20/41* (2022.01); *G06V 40/172* (2022.01); *H04N 23/62* (2023.01); *H04N 23/63* (2023.01); *H04N 23/69* (2023.01)

(58) Field of Classification Search
CPC ...... H04N 23/611; H04N 23/62; H04N 23/63; H04N 23/69; G06V 10/225; G06V 10/75; G06V 20/41; G06V 40/172

USPC .................................................... 348/240.99
See application file for complete search history.

(56) References Cited

U.S. PATENT DOCUMENTS

| | | | | |
|---|---|---|---|---|
| 2003/0210329 A1* | 11/2003 | Aagaard | ............. | H04N 17/002 348/E7.086 |
| 2006/0069999 A1* | 3/2006 | Mitsuhashi | ........ | H04N 1/00198 715/730 |
| 2007/0035436 A1* | 2/2007 | Thompson | ............. | G01S 7/411 342/182 |
| 2009/0103621 A1* | 4/2009 | Numata | ................. | G06T 7/223 375/E7.123 |
| 2018/0103208 A1* | 4/2018 | Jung | ...................... | H04N 23/62 |

* cited by examiner

*Primary Examiner* — Usman A Khan
(74) *Attorney, Agent, or Firm* — FIG. 1 Patents

(57) ABSTRACT

Techniques for updating zoom properties of corresponding salient objects are described that support parallel zooming for image comparison. In an implementation, a zoom input is received involving a salient object in a digital image in a user interface. An identification module identifies the salient object in the digital image and zoom properties for the salient object. A detection module identifies a corresponding salient object in at least one additional digital image and zoom properties for the corresponding salient object in the at least one additional digital image. An adjustment module then updates the zoom properties for the corresponding salient object in the at least one additional digital image based on the zoom properties for the salient object in the digital image.

20 Claims, 10 Drawing Sheets

UPDATING ZOOM PROPERTIES OF CORRESPONDING SALIENT OBJECTS

BACKGROUND

Digital image-viewing apps enable side-by-side comparison of multiple images. This allows viewers to compare similar digital images to determine which has favorable properties before selecting the best digital image. Some applications support conventional zoom comparison, during which zooming into a particular region of one digital image leads to the other image being zoomed into the same region. However, this conventional zoom comparison technique is based on the coordinates of the region being zoomed relative to the coordinates of the original digital image. This leads to inaccurate zooming if the intended subject of the zoom is located in a different region in the other digital image. Additionally, the zoom factor is kept the same across the digital images being zoomed in conventional zoom comparison techniques. Accordingly, images are under-zoomed or over-zoomed if the digital images are not the same scale before being zoomed using conventional zoom comparison techniques.

SUMMARY

Techniques for updating zoom properties of corresponding salient objects are described that support parallel zooming for digital image comparison. In an example, a zoom input is received involving a salient object in a digital image in a user interface. An identification module then identifies the salient object in the digital image and zoom properties for the salient object. A detection module identifies a corresponding salient object in at least one additional digital image and zoom properties for the corresponding salient object in the at least one additional digital image. An adjustment module then updates the zoom properties for the corresponding salient object in the at least one additional digital image based on the zoom properties for the salient object in the digital image. Updating the zoom properties of the corresponding salient object based on the zoom properties of the salient object ensures that the corresponding salient object is viewable at a corresponding size and location in the user interface as the salient object. This results in the parallel zoom operation targeting the intended object in both digital images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
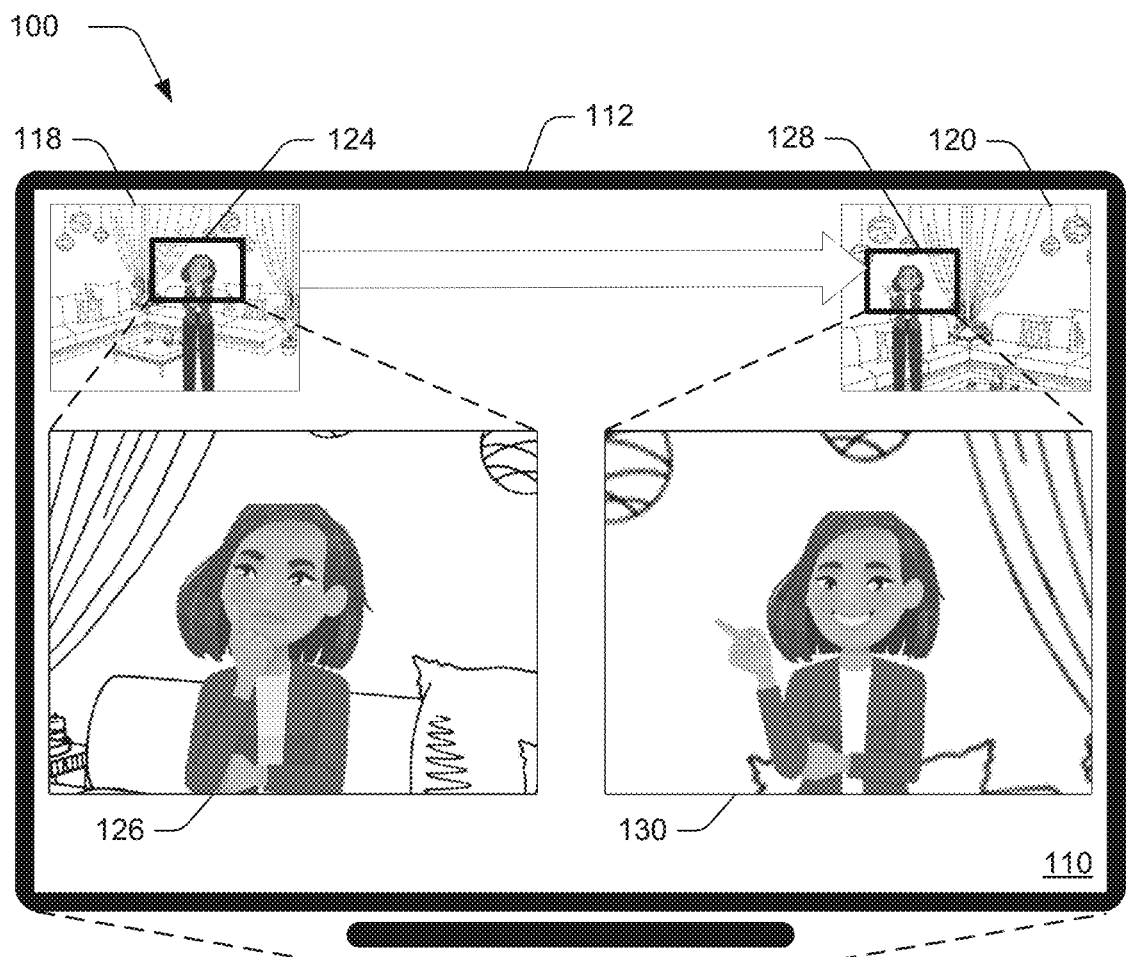
FIG. 1 is an illustration of a digital medium environment in an example implementation that is operable to employ the updating zoom properties of corresponding salient objects techniques described herein.
Figure 1:
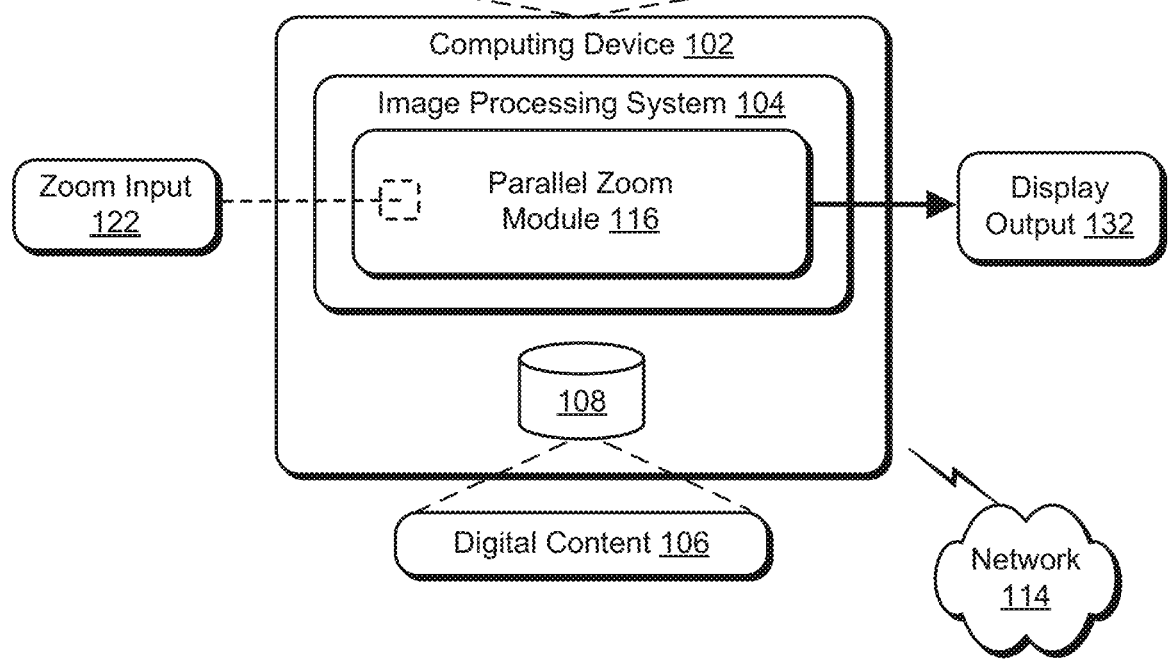

Parallel zooming is a technique used to compare similar digital images side-by-side. This allows viewers to determine which digital image has favorable properties before selecting the best digital image. For instance, a user takes multiple digital images of the same subject, but each digital image has slight variations. The user then desires to compare the digital images to check which digital image has the right facial expression, verify that the main subject is in focus, experiment with different permutations of digital image composition, or for any number of reasons. When comparing digital images, the user generally intends to zoom into a specific object in the digital images, such as a person, an animal, a building, a sign, or any number of specific objects.

Conventional parallel zooming applications allow a user to simultaneously zoom into the same region of multiple digital images. For example, zooming into the upper-left corner of a first digital image results in the automatic zoom into the upper-left corner of a second digital image. However, conventional zoom comparison techniques are based on the coordinates of the region being zoomed relative to the coordinates of the original digital image. This is problematic when a user intends to zoom into a specific object in the digital images, leading to inaccurate zooming if the intended object is located in a different region in the other digital image.

Conventional zoom comparison techniques also keep the zoom factor constant across the digital images being zoomed. For example, if the first digital image is zoomed by the user to a scale of x2, the second digital image is automatically zoomed to a scale of x2. Accordingly, digital images are under-zoomed or over-zoomed if the digital images are not the same scale before being zoomed using conventional zoom comparison techniques.

Additionally, conventional solutions to correcting inaccurate parallel zooming are limited to manually correcting the zoom of the second digital image. However, this can be time-consuming and difficult to perform manually. Thus, conventional techniques for parallel zooming are limited in functionality.

Accordingly, techniques for updating zoom properties of corresponding salient objects are described that overcome conventional challenges. Rather than zooming into the same region of the second digital image based on the coordinates of the zoomed portion of the first digital image, a parallel zoom module first identifies the zoomed object in the first digital image. This allows the parallel zoom module to identify a corresponding object in the second digital image and zoom properties for both the object and the corresponding object. Then, the zoom properties of the corresponding object in the second digital image are updated by the parallel zoom module based on the zoom properties of the object in the first digital image, ensuring the corresponding object is viewable as the same size and in the same portion of the frame as the first object. This results in the parallel zoom operation targeting the intended object in both digital images.

In an example, a computing device implements a parallel zoom module that receives a digital image. The parallel zoom module also receives a zoom input. The zoom input involves a user interaction with the digital image in the user interface, such as a user input targeting a portion of the digital image to zoom into a salient object. A salient object is an important or prominent object in the digital image. An example of a user input is a user pinching a portion of a digital image featuring a face in order to zoom into the face.

The parallel zoom module also receives an additional digital image, which is related to the digital image. The parallel zoom module then identifies a corresponding salient object in the additional digital image that corresponds to the salient object in the digital image. An example of a corresponding salient object is a person that appears in both digital images. In this example, a user desires to compare the digital image and the additional digital image to determine which features a better image of the person.

To achieve this, the parallel zoom module also identifies zoom properties for the corresponding salient object. Parallel zoom properties include image scale and relative offset. Image scale is the size of the salient object relative to a visible region of the digital image displayed in the user interface. Relative offset is a location of the salient object relative to a visible region of the digital image displayed in the user interface. The relative offset is determined if the salient object is not featured in the center of the visible region of the digital image.

The parallel zoom module then uses the zoom properties of the salient object to update the zoom properties of the corresponding salient object so that the corresponding salient object appears the same size as the salient object and also appears in the same corresponding region of the additional digital image as the salient object appears in the digital image. For instance, the image scale of the salient object is used to update the image scale of the corresponding salient object, and the relative offset of the salient object is used to update the relative offset of the corresponding salient object. This results in an updated view of the additional digital image in the user interface that is focused on the subject of the zoom in the digital image. The parallel zoom module then outputs the updated additional digital image as a display output in the user interface.

In another example, an identification module of the parallel zoom module identifies that a face is the salient object being zoomed in the digital image. The identification module then assigns a specific person identification to the face in the digital image for a detection module to reference when detecting the corresponding salient object. In response to the identification module identifying the face in the digital image, a detection module of the parallel zoom module detects a corresponding face in the additional digital image. To detect a corresponding face, the detection module assigns a person identification to any detected face in the additional digital image before determining a corresponding face that has similar facial features of the face in the digital image, which is performed by a variety of facial recognition techniques. The parallel zoom module then continues to identify zoom properties for both faces and then updates the zoom properties for the corresponding face in the additional digital image so that the corresponding face appears the same size as the face in the user interface and also appears in the same corresponding region of the additional digital image as the face appears in the digital image.

Updating zoom properties of corresponding salient objects overcomes the disadvantages of conventional zoom comparison techniques. For example, using the zoom properties of the salient object to update the zoom properties of the corresponding salient object ensures that the corresponding salient object appears in the same corresponding region of the additional digital image as the salient object appears in the digital image. This also results in an updated view in the user interface in which the corresponding salient object appears the same size as the object in the digital image. Doing so allows a user to easily compare two salient objects because they are framed and sized similarly. This eliminates the need for time-consuming and difficult manual zooming.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the updating zoom properties of corresponding salient objects techniques described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 is illustrated as including an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital content 106 is illustrated as a parallel zoom module 116. The parallel zoom module 116 is configured in the illustrated example to adjust zoom properties of corresponding salient objects. Functionality of the parallel zoom module 116 is shown in the illustrated example based on a digital image 118 and an additional digital image 120.

The parallel zoom module 116 receives a digital image 118. The parallel zoom module 116 also receives a zoom input 122. The zoom input 122 involves a salient object 124 in the digital image 118, which is a prominent object in the digital image 118. For example, the zoom input 122 is a user input targeting a portion of the digital image 118 to zoom into a particular object. The digital image 118 reflecting the zoom input 122 is depicted as the updated digital image view region 126. Here, the digital image 118 has been zoomed to focus on the salient object 124, which is the woman in this example.

The parallel zoom module 116 also receives an additional digital image 120. In some examples, the digital image 118 and the additional digital image 120 are frames of a video. The parallel zoom module 116 identifies a corresponding salient object 128 in the additional digital image 120 that corresponds to the salient object 124 in the digital image 118. Here, the corresponding salient object 128 is the same woman that is the salient object 124 featured in the digital image 118, but she appears different (e.g., standing in a different position and has a different expression). For this reason, a user wants to compare the digital image 118 and the additional digital image 120 to determine which is the best digital image. To achieve this, the parallel zoom module 116 also identifies zoom properties for the corresponding salient object 128.

The parallel zoom module 116 then updates the zoom properties for the corresponding salient object 128 based on the zoom properties for the salient object 124 in the digital image 118. Using the updated zoom properties, the parallel zoom module 116 generates an updated additional digital image view 130 focused on the subject of the zoom in the digital image 118, which is the woman in this example. The parallel zoom module 116 outputs the updated additional digital image view 130 as a display output 132 in the user interface 110.

Conventional parallel-zooming applications are limited to zooming a second digital image based on the coordinates of the zoomed-in area of the first digital image. Consider a situation in which a user of a conventional parallel-zooming application wants to compare two digital images featuring a person's face, but the face does not appear in the same region of both digital images, e.g. the face is featured in the center of the first digital image but in the upper-right corner of the second digital image. A user input is received to zoom into the face in the center of the first digital image. In response, the second digital image is automatically zoomed into the same center region by matching the zoomed coordinates of the first digital image. However, the face in the second digital image is then cut out of the digital image in conventional techniques, limiting the user's ability to compare the faces in the two digital images.

Updating zoom properties of corresponding salient objects overcomes conventional limitations to accurately zoom into a corresponding salient object 128. This is performed by identifying both the salient object 124 and the corresponding salient object 128 as well as zoom properties for the salient object 124 and the corresponding salient object 128. The zoom properties for the corresponding salient object 128 are then updated based on the zoom properties for the salient object 124 in the digital image 118. This ensures that the corresponding salient object 128 is viewable as the same size and in the same portion of the frame as the salient object 124. This also results in the parallel zoom operation targeting the intended object in both digital images.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Updating Zoom Properties of Corresponding Salient Objects

Figure 2:
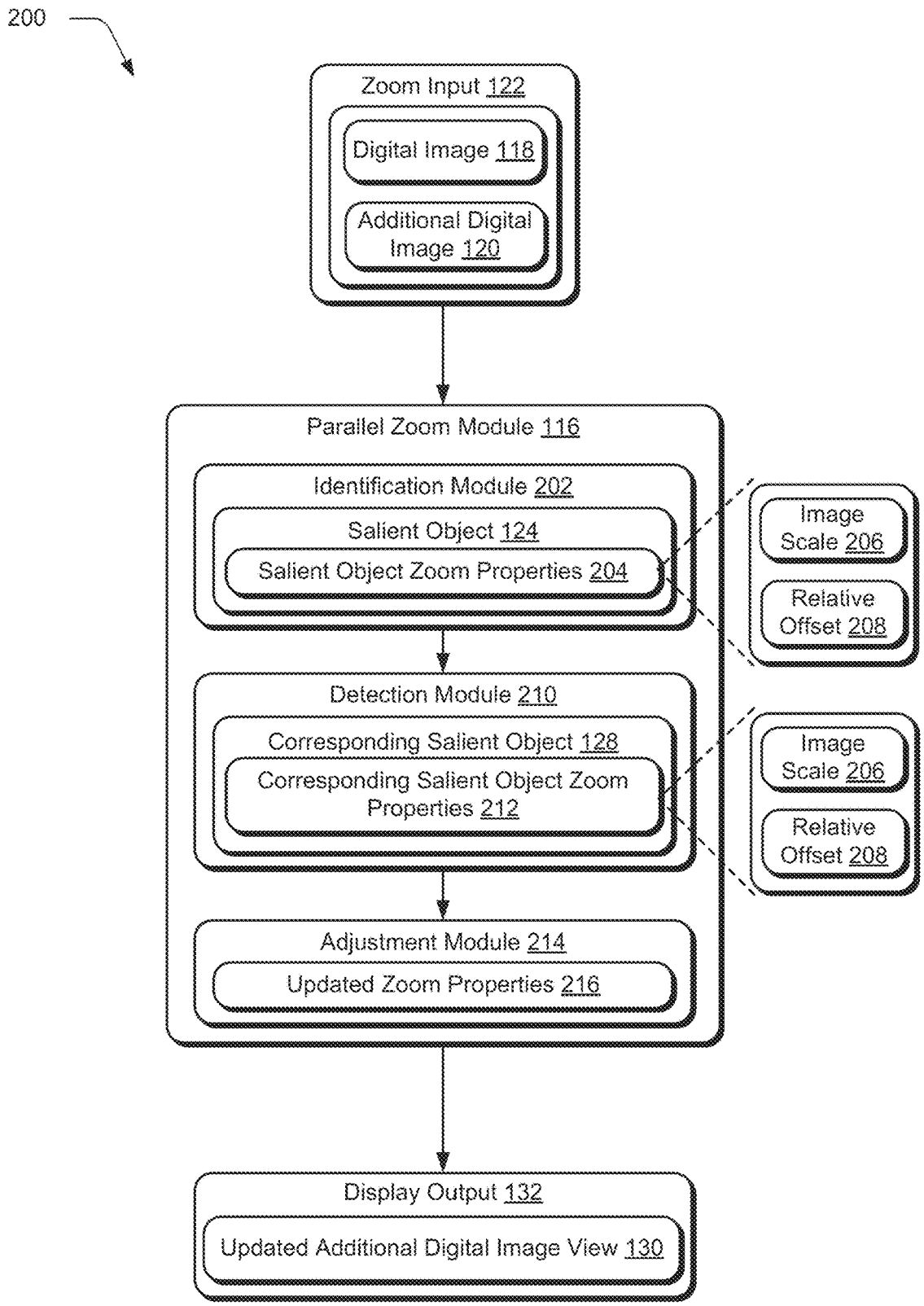
FIG. 2 depicts a system in an example implementation showing operation of the parallel zoom module of FIG. 1 in greater detail.

FIG. 2 depicts a system 200 in an example implementation showing operation of the parallel zoom module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-9.

To begin in this example, the parallel zoom module 116 receives a zoom input 122, which involves a salient object 124 of a digital image 118. The parallel zoom module 116 also receives an additional digital image 120, which is related to the digital image 118.

The parallel zoom module 116 includes an identification module 202. The identification module 202 identifies the salient object 124 in the digital image 118. The salient object 124 is a prominent object or an important object in the digital image 118. In some examples, the salient object 124 is the selected object being zoomed by the user. The identification module 202 identifies the salient object 124 based on a variety of methods, including based on the user's gesture or by analyzing the objects in the digital image 118 in the viewable region of the user interface 110.

For example, if a user begins a zoom gesture starting at an object, that object is determined by the identification module 202 to be the salient object 124. If a user's zoom gesture does not start at an object but instead ends at an object, that object is determined by the identification module 202 to be the salient object 124. If a drag zoom gesture touches multiple objects in the digital image 118, the object that is closest to the mid-point of the start-point and end-point location is the salient object 124. If no salient object 124 is identified by the identification module 202 from a user zoom gesture, the default salient object 124 is the center region of the viewable region of the user interface 110. In another example, if no user zoom input is received, the salient object is determined by the identification module 202 based on prominence or importance in the viewable region of the user interface 110.

The identification module 202 also identifies salient object zoom properties 204 for the salient object 124. Salient object zoom properties 204 include image scale 206 and relative offset 208. Image scale 206 is a size of the salient object 124 relative to a visible region of the digital image 118 displayed in the user interface 110. Relative offset 208 is a location of the salient object 124 relative to a visible region of the digital image 118 displayed in the user interface 110. The relative offset 208 is determined if the salient object 124 is not featured in the center of the visible region of the digital image 118.

The parallel zoom module 116 also includes a detection module 210. The detection module 210 detects a corresponding salient object 128 in the additional digital image 120. This is performed by first detecting all objects in the additional digital image 120 before determining which object corresponds to the salient object 124. Examples of detecting a corresponding salient object are discussed below with respect to FIGS. 3-7.

The detection module 210 also detects corresponding salient object zoom properties 212 for the corresponding salient object 128. Corresponding salient object zoom properties 212 also include image scale 206 and relative offset 208. Image scale 206 is the size of the corresponding salient object 128 relative to a visible region of the additional digital image 120, e.g., as displayed in the user interface 110. Relative offset 208 is a location of the corresponding salient object 128 relative to a visible region of the additional digital image 120, e.g., as displayed in the user interface 110.

The parallel zoom module 116 also includes an adjustment module 214. The adjustment module 214 generates updated zoom properties 216 for the corresponding salient object 128 based on the salient object zoom properties 204. The parallel zoom module 116 then uses the updated zoom properties 216 to output an updated additional digital image view 130 as a display output 132 in the user interface 110.

FIGS. 3-7 depict stages of updating zoom properties of a corresponding salient object 128. In some examples, the stages depicted in these figures are performed in a different order than described below.

Figure 3:
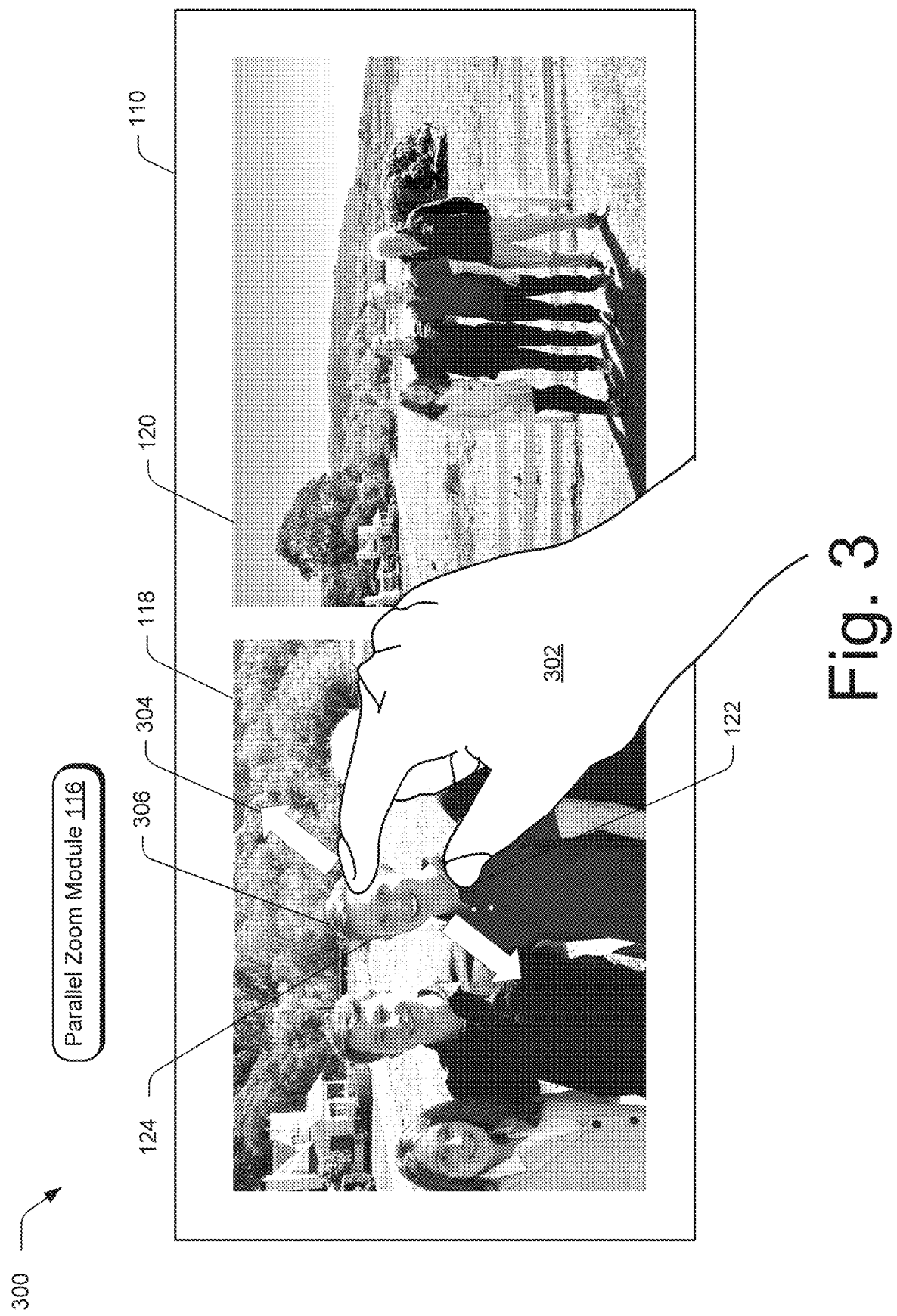
FIG. 3 depicts an example of receiving a zoom input involving a salient object in a digital image in a user interface.

FIG. 3 depicts an example 300 of receiving a zoom input 122 involving a salient object 124 in a digital image 118 in the user interface 110. As illustrated, the parallel zoom module 116 receives both a digital image 118 and an additional digital image 120. The digital image 118 and the additional digital image 120 are displayed in the user interface 110. The parallel zoom module 116 also receives a zoom input 122 prompted by a user 302 interacting with the digital image 118 in the user interface 110. In this example, the zoom input 122 is a pinch out gesture 304 targeting a salient object 124 in the digital image 118. Here, the pinch out gesture 304 begins at a person 306 in the digital image 118 and pinches away from the person 306. In this example, the user 302 performed the pinch out gesture 304 to zoom the digital image 118 into its current frame displayed in FIG. 3. The origin of the pinch out gesture 304 identifies the person 306 as the salient object 124 in the digital image 118, as explained in detail in FIG. 4 below.

A pinch out gesture 304 is one type of zoom input 122. Alternative or additional examples of a zoom input 122 include a variety of zoom gestures. Tapping, pinching, dragging, and clicking buttons are additional examples of zoom gestures performed by interacting with a user interface 110. For example, if a zoom gesture does not start at an object but instead ends at an object, that object is determined to be the salient object 124. If a drag zoom gesture touches multiple objects in the digital image 118, the object that is closest to the mid-point of the start-point and end-point location is the salient object 124. If no salient object 124 is identified from a user zoom gesture, the default salient object 124 is the center region of the viewable region of the user interface 110. In another example, if no user zoom input 122 is received, the salient object is determined by the identification module 202 based on prominence or importance in the viewable region of the user interface 110.

Figure 4:
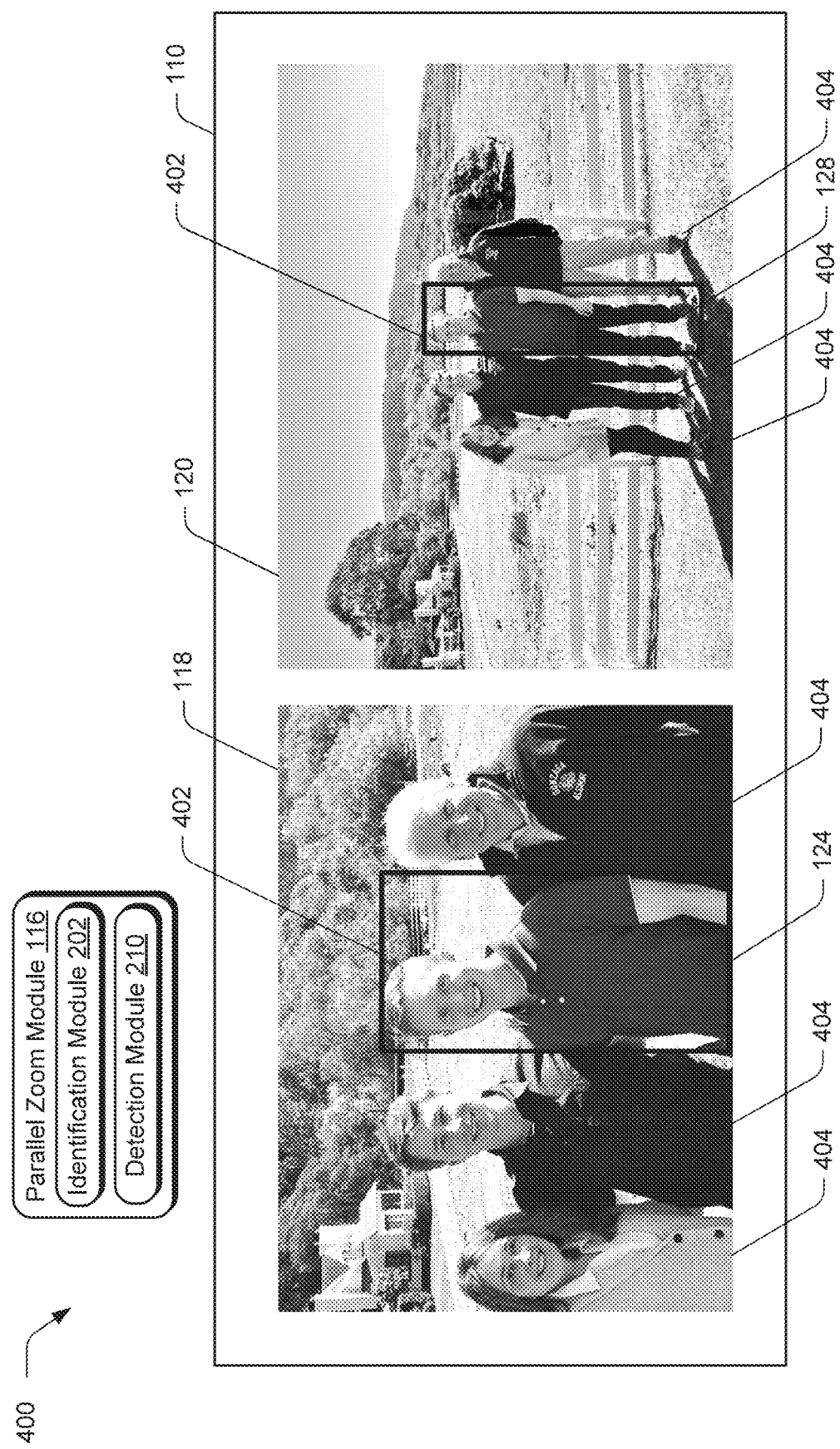
FIG. 4 depicts an example of identifying the salient object in the digital image and a corresponding salient object in the additional digital image.

FIG. 4 depicts an example 400 of identifying the salient object 124 in the digital image 118 and the corresponding salient object 128 in the additional digital image 120. FIG. 4 is a continuation of the example described in FIG. 3. As discussed earlier with respect to FIG. 3, the parallel zoom module 116 receives a zoom input 122 prompted by a user 302 interacting with the digital image 118 in the user interface 110. The zoom input 122 is a pinch out gesture 304 targeting a salient object 124 in the digital image 118. The parallel zoom module 116 identifies the person in the digital image 118 because the pinch out gesture 304 began at the person in the digital image 118 and pinched away from the person.

Returning to FIG. 4, the identification module 202 generates a bounding box 402 around the salient object 124 in the digital image 118 in response to identifying the person in the digital image 118 as the salient object 124. The bounding box 402 is closely tailored to the outside contours of the salient object 124, identifying the region of the digital image 118 in which the salient object 124 occupies.

Alternatively or additionally, the identification module 202 identifies an additional salient object 404 in the digital image 118 before determining which salient object 124 is the subject of the zoom input 122.

In some examples, if the salient object 124 is a person, different body parts of the person are labeled. The labels assigned and stored with the digital image 118 or generated on demand in real time. If the salient object 124 is a person, the region of the digital image 118 containing the salient object 124 is further processed to identify different body parts of the person using a combination of a skin-segmentation model, which assigns different pixel masks to different body parts and a body-tracking model, which identifies the area of the digital image 118 that contains the body part.

Alternatively or additionally, the identification module 202 passes the digital image 118 through an object detection model to generate a pixel mask for the digital image 118 along with a label denoting an object class. The pixel mask is then used to compute the bounding box 402 for the salient object 124.

In response to the identification module 202 identifying the salient object 124 in the digital image 118, the detection module 210 detects the corresponding salient object 128 in the additional digital image 120. The detection module 210 also generates a bounding box 402 around the corresponding salient object 128 in the additional digital image 120. The bounding box 402 is closely tailored to the outside contours of the corresponding salient object 128, identifying the region of the additional digital image 120 in which the corresponding salient object 128 occupies.

Alternatively or additionally, the detection module 210 identifies an additional salient object 404 in the additional digital image 120 and assigns a label to the additional salient object 404 before determining which corresponding salient object 128 corresponds to the salient object 124.

Figure 5:
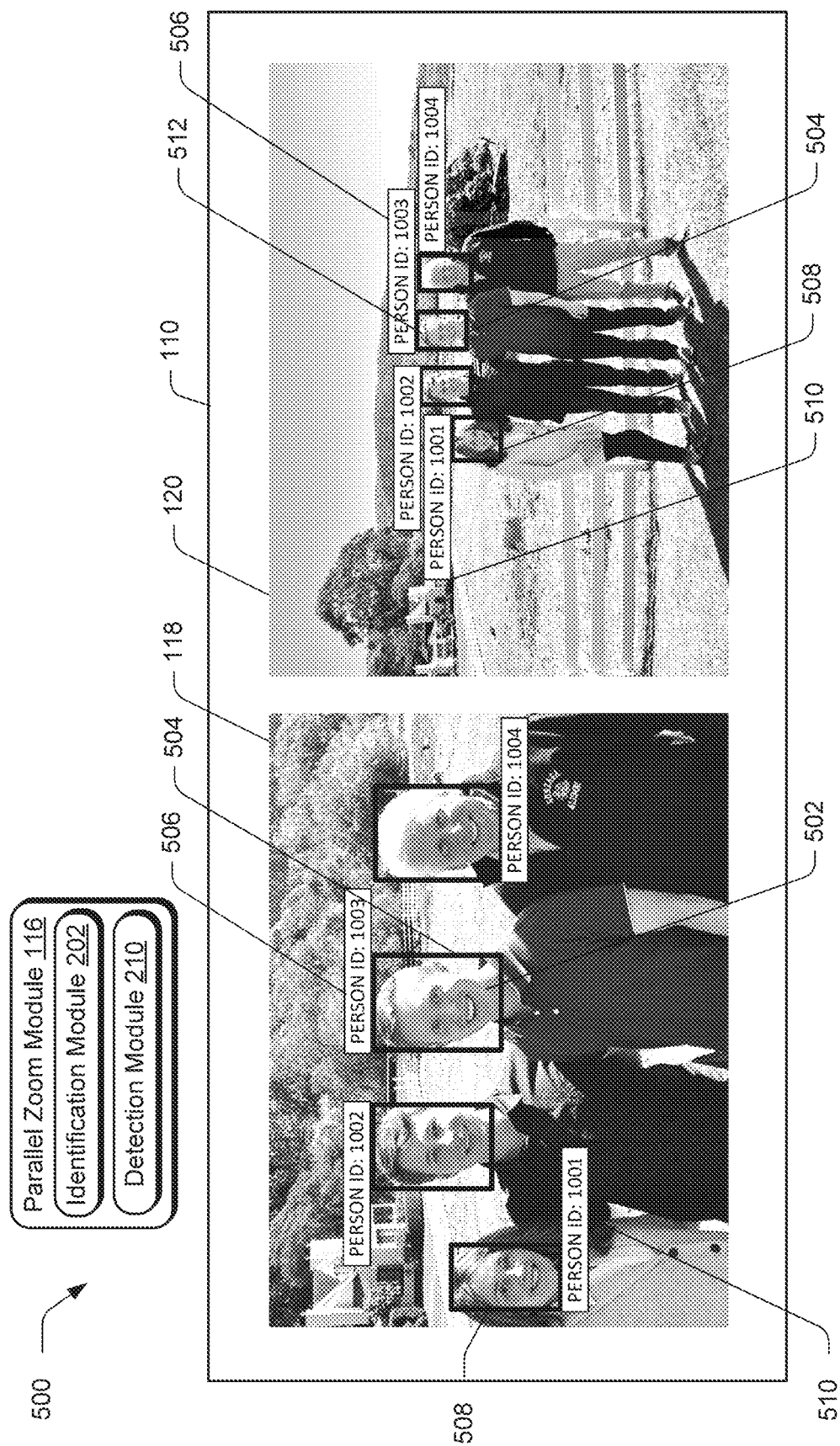
FIG. 5 depicts another example of identifying the salient object in the digital image and the corresponding salient object in the additional digital image.

FIG. 5 depicts another example 500 of identifying the salient object 124 in the digital image 118 and the corresponding salient object 128 in the additional digital image 120. FIG. 5 is a continuation of the example described in FIG. 3. As discussed earlier with respect to FIG. 3, the parallel zoom module 116 receives a zoom input 122 prompted by a user 302 interacting with the digital image 118 in the user interface 110. The zoom input 122 is a pinch out gesture 304 targeting a salient object 124 in the digital image 118. The parallel zoom module 116 identifies the person in the digital image 118 because the pinch out gesture 304 began at the person in the digital image 118 and pinched away from the person.

Returning to FIG. 5, the identification module 202 identifies that a face 502 is the salient object 124 in the digital image 118. The identification module 202 then generates a face bounding box 504 around the face 502 in the digital image 118, which is the salient object 124. The face bounding box 504 is closely tailored to the outside contours of the face 502, identifying the region of the digital image 118 in which the face 502 occupies.

The identification module 202 assigns a person identification 506 to the face 502 in the digital image 118 for the detection module 210 to reference when detecting the corresponding salient object 128. The person identification 506 is specific to each face identified. In some examples, if a face 502 is not the salient object 124 identified, an object label is used to identify a salient object 124 instead of a person identification 506. The object label is specific to each salient object identified.

Alternatively or additionally, the identification module 202 identifies an additional face 508 in the digital image 118 and assigns an additional person identification 510 to the additional face 508 before determining which salient object 124 is the subject of the zoom input 122.

In response to the identification module 202 identifying the face 502 in the digital image 118, the detection module 210 detects the corresponding salient object 128 in the additional digital image 120. If the salient object 124 is a face 502, the detection module 210 detects a corresponding face 512 in the additional digital image 120. To detect a corresponding face 512, the detection module 210 assigns a person identification 506 to any detected face in the additional digital image 120 before determining a corresponding face 512 that has similar facial features of the face 502 in the digital image 118. This is performed by a variety of facial recognition techniques. The detection module 210 also generates a face bounding box 504 around the corresponding face 512 in the additional digital image 120. The face bounding box 504 is closely tailored to the outside contours of the corresponding face 512, identifying the region of the additional digital image 120 in which the corresponding face 512 occupies.

Alternatively or additionally, the identification module 202 identifies an additional face 508 in the additional digital image 120 and assigns an additional person identification 510 to the additional face 508 before determining which corresponding face 512 corresponds with the face 502.

Figure 6:
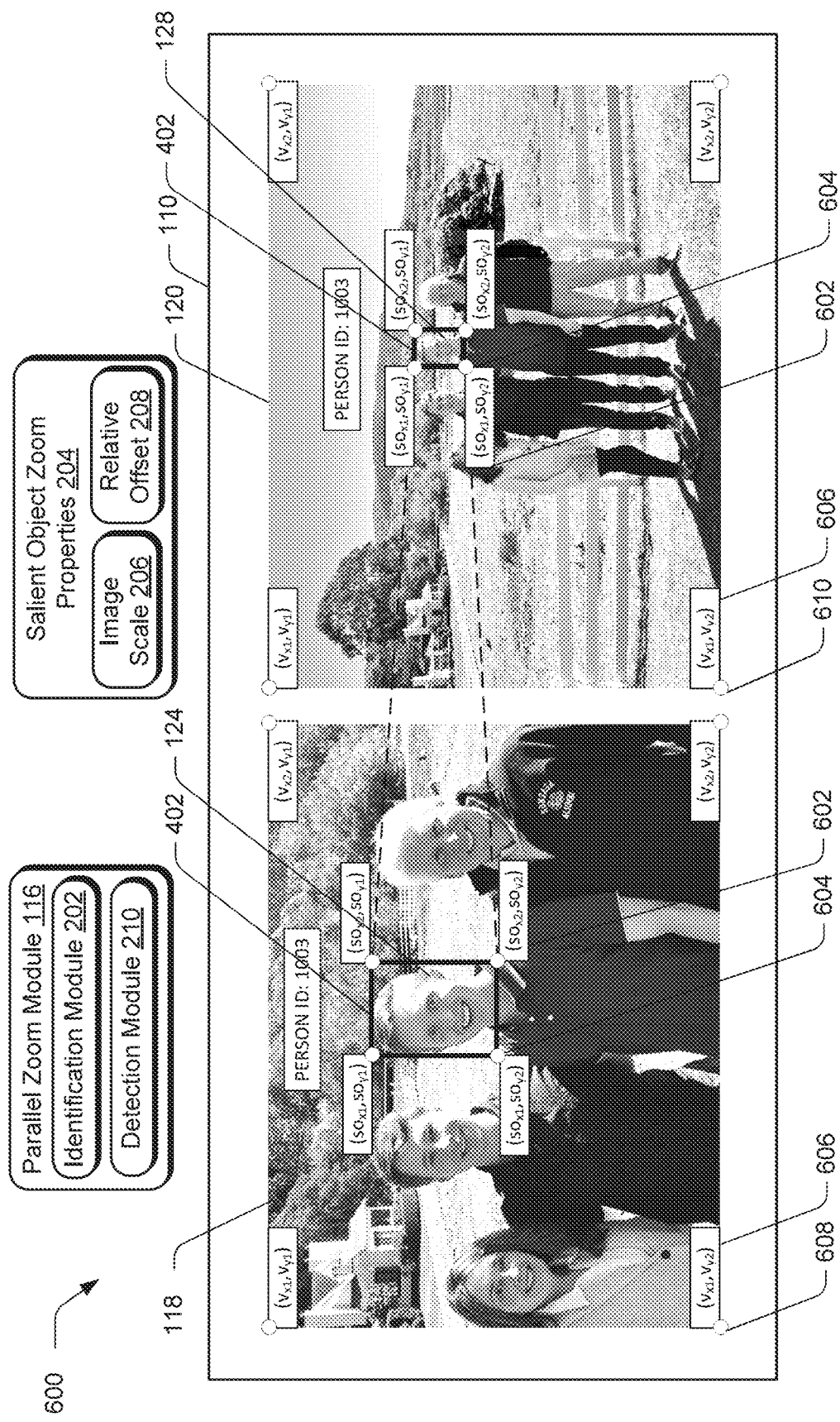
FIG. 6 depicts an example of identifying salient object zoom properties for the salient object in the digital image and identifying corresponding salient object zoom properties for the corresponding salient object in the additional digital image.

FIG. 6 depicts an example 600 of identifying zoom properties 204 for the salient object 124 in the digital image 118 and identifying corresponding salient object zoom properties 212 for the corresponding salient object 128 in the additional digital image 120. FIG. 6 is a continuation of the example described in FIGS. 4 and 5. As discussed earlier with respect to FIGS. 4 and 5, a corresponding salient object 128 is detected in the additional digital image 120 that corresponds to the salient object 124 in the digital image 118.

Returning to FIG. 6, the identification module 202 identifies salient object zoom properties 204 for the salient object 124. Salient object zoom properties 204 include image scale 206 and relative offset 208. To identify the salient object zoom properties 204, the identification module 202 assigns a set of pixel bounds 602 to each bounding box corner 604 around the salient object 124. Pixel bounds 602 are the pixel coordinates of the bounding box 402 of the salient object 124. The identification module 202 also assigns a set of normalized pixel bounds 606 to each digital image corner 608. The normalized pixel bounds 606 are the coordinates of the original size of the digital image 118. The pixel bounds 602 are compared to the normalized pixel bounds 606 to identify the image scale 206 of the salient object 124 compared to the digital image 118. The equation to calculate image scale 206 is:

$$\text{image scale} = \text{object area}/\text{view area}$$

where the view area is:

$$\text{view area} = (v_{x2} - v_{x1}) * (v_{y2} - v_{y1})$$

where $v_{x2}$, $v_{x1}$, $v_{y2}$, and $v_{y1}$ are values from normalized pixel bounds 606 $(v_{x1}, v_{y1})$, $(v_{x2}, v_{y1})$, $(v_{x1}, v_{y2})$, and $(v_{x2}, v_{y2})$, and where the object area is:

$$\text{object area} = (so_{x2} - so_{x1}) * (so_{y2} - so_{y1})$$

where $so_{x2}$, $so_{x1}$, $so_{y2}$, and $so_{y1}$ are values from the pixel bounds 602 $(so_{x1}, so_{y1})$, $(so_{x2}, so_{y1})$, $(so_{x1}, so_{y2})$, and $(so_{x2}, so_{y2})$.

The pixel bounds 602 are also compared to the normalized pixel bounds 606 to identify the relative offset 208 of the salient object 124 within the digital image 118. The equation to calculate the relative offset 208 coordinates is:

$$\{\text{off}_x, \text{off}_y\} = \{so_{mx} - v_{mx}, so_{my} - v_{my}\}$$

where the view midpoint is:

$$\{v_{mx}, v_{my}\} = \{(v_{x1} + v_{x2})/2, (v_{y1} + v_{y2})/2\}$$

where $v_{x2}$, $v_{x1}$, $v_{y2}$, and $v_{y1}$ are values from normalized pixel bounds 606 $(v_{x1}, v_{y1})$, $(v_{x2}, v_{y1})$, $(v_{x1}, v_{y2})$, and $(v_{x2}, v_{y2})$, and where the object midpoint is:

$$\{so_{mx}, so_{my}\} = \{(so_{x1} + so_{x2})/2, (so_{y1} + so_{y2})/2\}$$

where $so_{x2}$, $so_{x1}$, $so_{y2}$, and $so_{y1}$ are values from the pixel bounds 602 $(so_{x1}, so_{y1})$, $(so_{x2}, so_{y1})$, $(so_{x1}, so_{y2})$, and $(so_{x2}, so_{y2})$.

The detection module detects corresponding salient object zoom properties 212. To detect the corresponding salient object zoom properties 212, the detection module 210 assigns a set of pixel bounds 602 to each bounding box corner 604 around the corresponding salient object 128. Pixel bounds 602 are the pixel coordinates of the bounding box 402 of the corresponding salient object 128 in this example. The identification module 202 also assigns a set of normalized pixel bounds 606 to each additional digital image corner 610. The normalized pixel bounds 606 are the coordinates of the size of the additional digital image 120 in this example. The pixel bounds 602 are compared to the normalized pixel bounds 606 to identify the image scale 206 of the corresponding salient object 128 compared to the additional digital image 120. The equation to calculate image scale 206 is:

$$\text{image scale} = \text{object area}/\text{view area}$$

where the view area is:

$$\text{view area} = (v_{x2} - v_{x1}) * (v_{y2} - v_{y1})$$

where $v_{x2}$, $v_{x1}$, $v_{y2}$, and $v_{y1}$ are values from normalized pixel bounds 606 $(v_{x1}, v_{y1})$, $(v_{x2}, v_{y1})$, $(v_{x1}, v_{y2})$, and $(v_{x2}, v_{y2})$, and where the object area is:

$$\text{object area} = (so_{x2} - so_{x1}) * (so_{y2} - so_{y1})$$

where $so_{x2}$, $so_{x1}$, $so_{y2}$, and $so_{y1}$ are values from the pixel bounds 602 $(so_{x1}, so_{y1})$, $(so_{x2}, so_{y1})$, $(so_{x1}, so_{y2})$, and $(so_{x2}, so_{y2})$.

The pixel bounds 602 are also compared to the normalized pixel bounds 606 to identify the relative offset 208 of the corresponding salient object 128 within the additional digital image 120. The equation to calculate the relative offset 208 coordinates is:

$$\{\text{off}_x, \text{off}_y\} = \{so_{mx} - v_{mx}, so_{my} - v_{my}\}$$

where the view midpoint is:

$$\{v_{mx}, v_{my}\} = \{(v_{x1} + v_{x2})/2, (v_{y1} + v_{y2})/2\}$$

where $v_{x2}$, $v_{x1}$, $v_{y2}$, and $v_{y1}$ are values from normalized pixel bounds 606 $(v_{x1}, v_{y1})$, $(v_{x2}, v_{y1})$, $(v_{x1}, v_{y2})$, and $(v_{x2}, v_{y2})$, and where the object midpoint is:

$$\{so_{mx}, so_{my}\} = \{(so_{x1} + so_{x2})/2, (so_{y1} + so_{y2})/2)\}$$

where $so_{x2}$, $so_{x1}$, $so_{y2}$, and $so_{y1}$ are values from the pixel bounds 602 $(so_{x1}, so_{y1})$, $(so_{x2}, so_{y1})$, $(so_{x1}, so_{y2})$, and $(so_{x2}, so_{y2})$.

Figure 7:
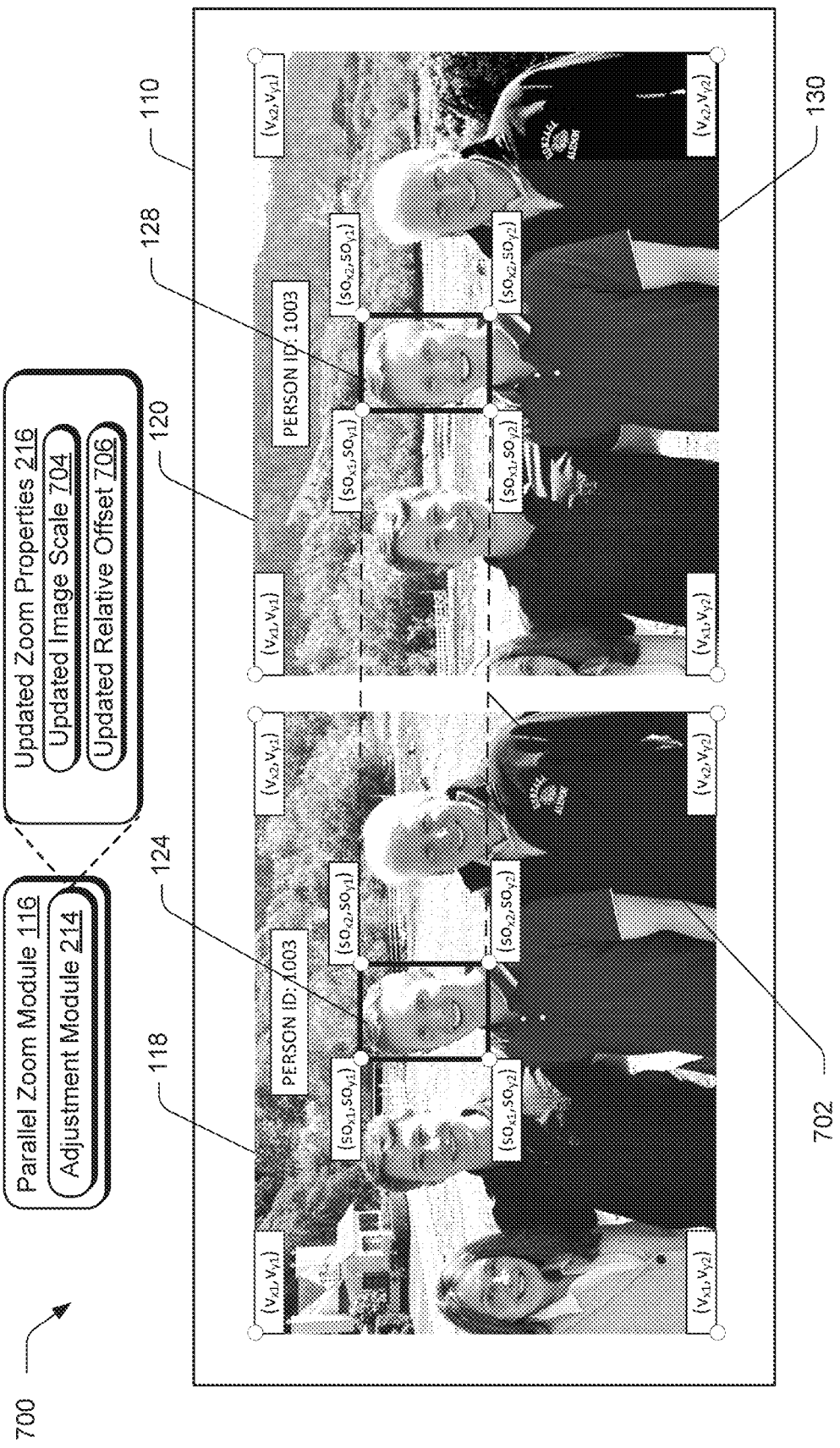
FIG. 7 depicts an example of generating updated zoom properties for the corresponding salient object in the additional digital image based on the salient object zoom properties for the salient object in the digital image.

FIG. 7 depicts an example 700 of generating updated zoom properties 216 for the corresponding salient object 128 in the additional digital image 120 based on the salient object zoom properties 204 for the salient object 124 in the digital image 118.

The adjustment module 214 receives the salient object zoom properties 204 from the identification module 202 and the corresponding salient object zoom properties 212 from the detection module 210. Using the salient object zoom properties 204 and the corresponding salient object zoom properties 212, the adjustment module 214 generates an image mapping 702 comparing the image scale 206 of the salient object 124 to the image scale 206 of the corresponding salient object 128. The image mapping 702 also compares the relative offset 208 of the salient object 124 to the relative offset 208 of the corresponding salient object 128.

The adjustment module 214 then generates updated zoom properties 216 for the corresponding salient object 128 based on the image mapping 702. The updated zoom properties 216 include an updated image scale 704 and an updated relative offset 706.

The equation for updated image scale 704 is:

$$\text{updated image scale} = \text{image scale} * \text{view area}$$

A zoom factor for the corresponding salient object 128 is also calculated from the updated image scale 704. The equation for the zoom factor is:

$$\text{updated image scale}/\text{object area}$$

The updated image scale 704 is a similar size to the image scale 206 of the salient object 124 in the digital image 118. The adjustment module 214 creates an updated additional digital image view 130 by zooming into the additional digital image 120 based on the updated image scale 704. This creates the visual appearance that the salient object 124 and the corresponding salient object 128 are the same size in the user interface 110.

The equation for updated relative offset 706 is equal to the relative offset 208 calculated for the salient object 124 of the digital image 118. The adjustment module 214 also creates an updated additional digital image view 130 by repositioning the visible frame of the corresponding salient object 128 at a location such that the corresponding salient object 128 midpoint is located at the updated relative offset 706. This creates the visual appearance that the salient object 124 is located in the same region of the digital image 118 as the corresponding salient object 128 in the additional digital image 120. For example, the face in the additional digital image 120 now appears the same size as the face zoomed into in the digital image 118 and appears in the center of the frame of the additional digital image 120 in a similar fashion to the face in the digital image 118.

In some examples, after the zoom properties 212 for the corresponding salient object 128 in the additional digital image 120 are updated, the parallel zoom module 116 receives an additional zoom input. This results in further updating the updated zoom properties 216 for the corresponding salient object 128 in the additional digital image 120 based on the additional zoom input.

In this way, the techniques for updating zoom properties of corresponding salient objects are able to overcome the limitations of conventional techniques, allowing a user to easily compare the salient object 124 in the digital image 118 to the corresponding salient object 128 in the additional digital image 120.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

Figure 8:
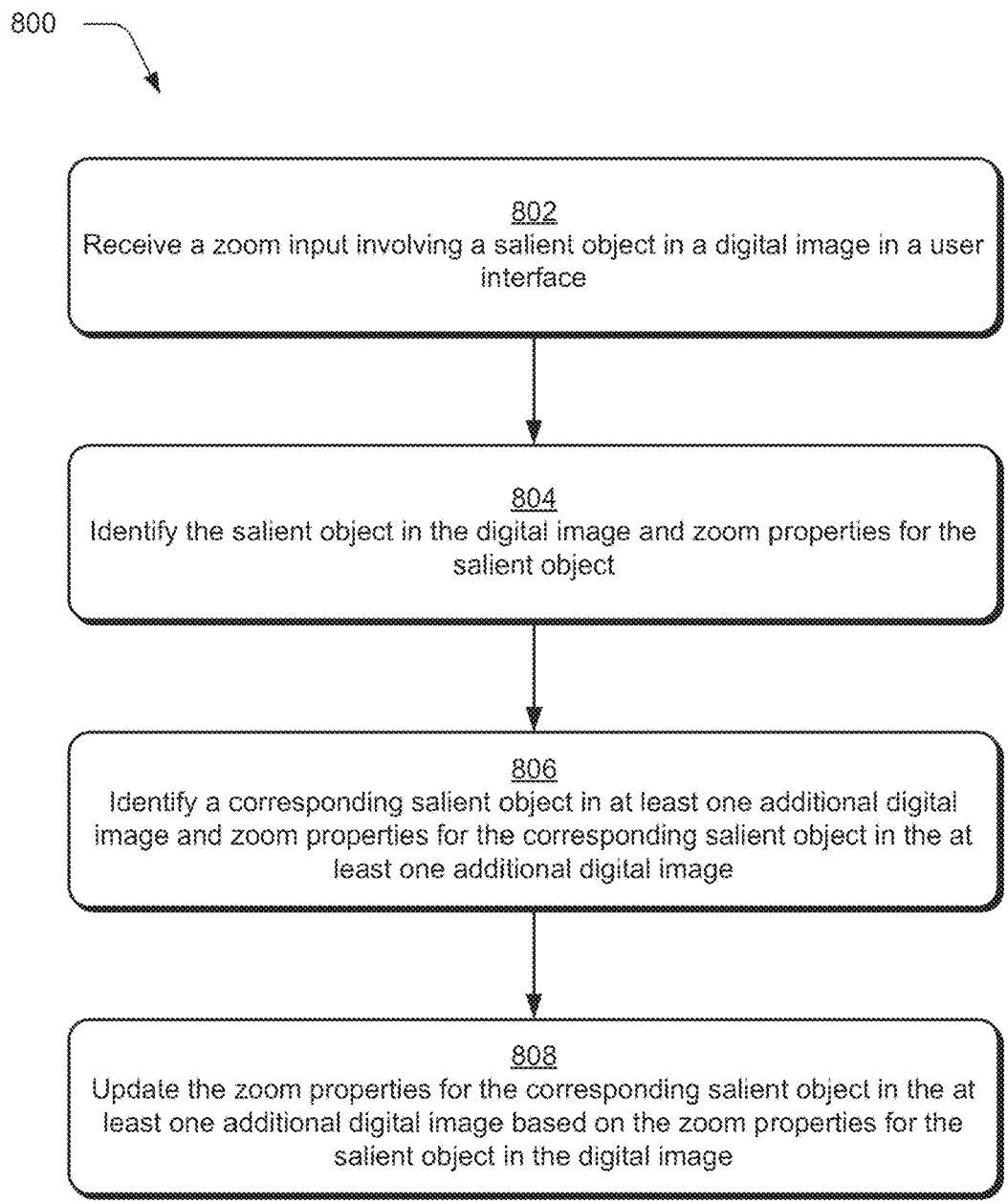
FIG. 8 depicts a procedure in an example implementation of updating zoom properties of corresponding salient objects.

FIG. 8 depicts a procedure 800 in an example implementation of updating zoom properties of corresponding salient objects. At block 802, a zoom input 122 involving a salient object 124 in a digital image 118 in a user interface 110 is received.

At block 804, a salient object 124 in the digital image 118 and zoom properties 204 for the salient object 124 are identified. In some examples, identifying the zoom properties 204 for the salient object 124 in the digital image 118 includes determining an image scale 206. Additionally or alternatively, identifying the zoom properties 204 for the salient object 124 in the digital image 118 includes determining a relative offset 208 within a region of the salient object 124. For instance, determining a relative offset 208 within a region of the salient object 124 includes assigning coordinates to the salient object 124 based on a bounding box. In some examples, identifying the salient object 124 in the digital image 118 involves identifying a prominent object.

At block 806, a corresponding salient object 128 in at least one additional digital image 120 and zoom properties 204 for the corresponding salient object 128 in the at least one additional digital image 120 are identified. In some examples, the digital image 118 and the at least one additional digital image 120 are frames of a video. Additionally or alternatively, identifying the corresponding salient object 128 in the at least one additional digital image 120 includes generating a cross-image mapping for the salient objects in the digital image 118 and the at least one additional digital image 120. In some examples, identifying the corresponding salient object 128 in the at least one additional digital image 120 includes assigning a person identification 506 to a face 502 in the digital image 118 and identifying a corresponding face 512 with a matching person identification in the at least one additional digital image 120. Additionally or alternatively, identifying the zoom properties 212 for the corresponding salient object 128 in the at least one additional digital image 120 includes determining an image scale 206. For instance, identifying the zoom properties 212 for the corresponding salient object 128 in the at least one additional digital image 120 includes determining a relative offset 208 within a region of the corresponding salient object 128. In some examples, identifying the corresponding salient object 128 in at least one additional digital image 120 involves identifying a prominent object.

At block 808, the zoom properties 204 for the corresponding salient object 128 in the at least one additional digital image 120 are updated based on the zoom properties 212 for the salient object 124 in the digital image 118. Additionally or alternatively, updating the zoom properties 212 for the corresponding salient object 128 in the at least one additional digital image 120 is based on the zoom properties 212 for the salient object 124 in the digital image 118 and is based on an additional user input.

Figure 9:
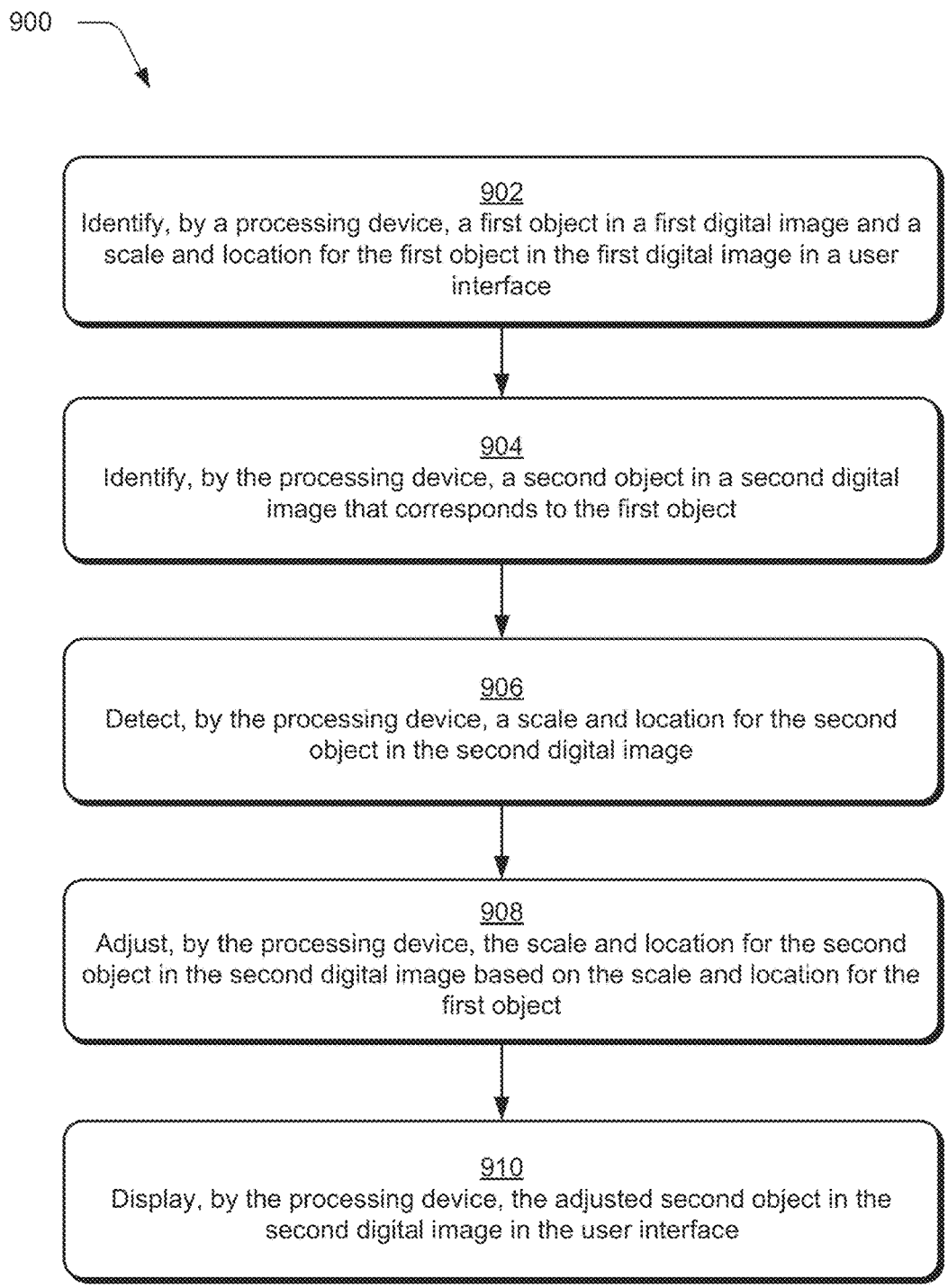
FIG. 9 depicts a procedure in an additional example implementation of updating zoom properties of corresponding salient objects.

FIG. 9 depicts a procedure 900 in an additional example implementation of updating zoom properties of corresponding salient objects. At block 902, a first object in a first digital image and a scale and location for the first object in the first digital image in a user interface are identified by a processing device. In some examples, identifying a location for the first object in the first digital image includes identifying a relative offset 208 within a region of the first object in the first digital image. Additionally or alternatively, coordinates are assigned to the first object based on a bounding box 402.

At block 904, a second object in a second digital image that corresponds to the first object are identified by the processing device. In some examples, identifying the second object in the second digital image includes generating a cross-image mapping for objects in the first digital image and the second digital image. In some examples, identifying the second object in the second image includes assigning a person identification 506 to a face 502 in the first digital image and identifying a corresponding face 512 with a matching person identification in the second digital image.

At block 906, a scale and location for the second object in the second digital image are detected by the processing device. In some examples, detecting a location for the second object in the second digital image includes determining a relative offset 208 within a region of the second object in the second digital image. Additionally or alternatively, coordinates are assigned to the second object based on a bounding box 402.

At block 908, the scale and location for the second object in the second digital image are adjusted based on the scale and location for the first object. Additionally or alternatively, updating the scale and location for the second object in the second digital image is based on an additional user input At block 910, the adjusted second object in the second digital image in the user interface is displayed by the processing device.

Example System and Device

Figure 10:
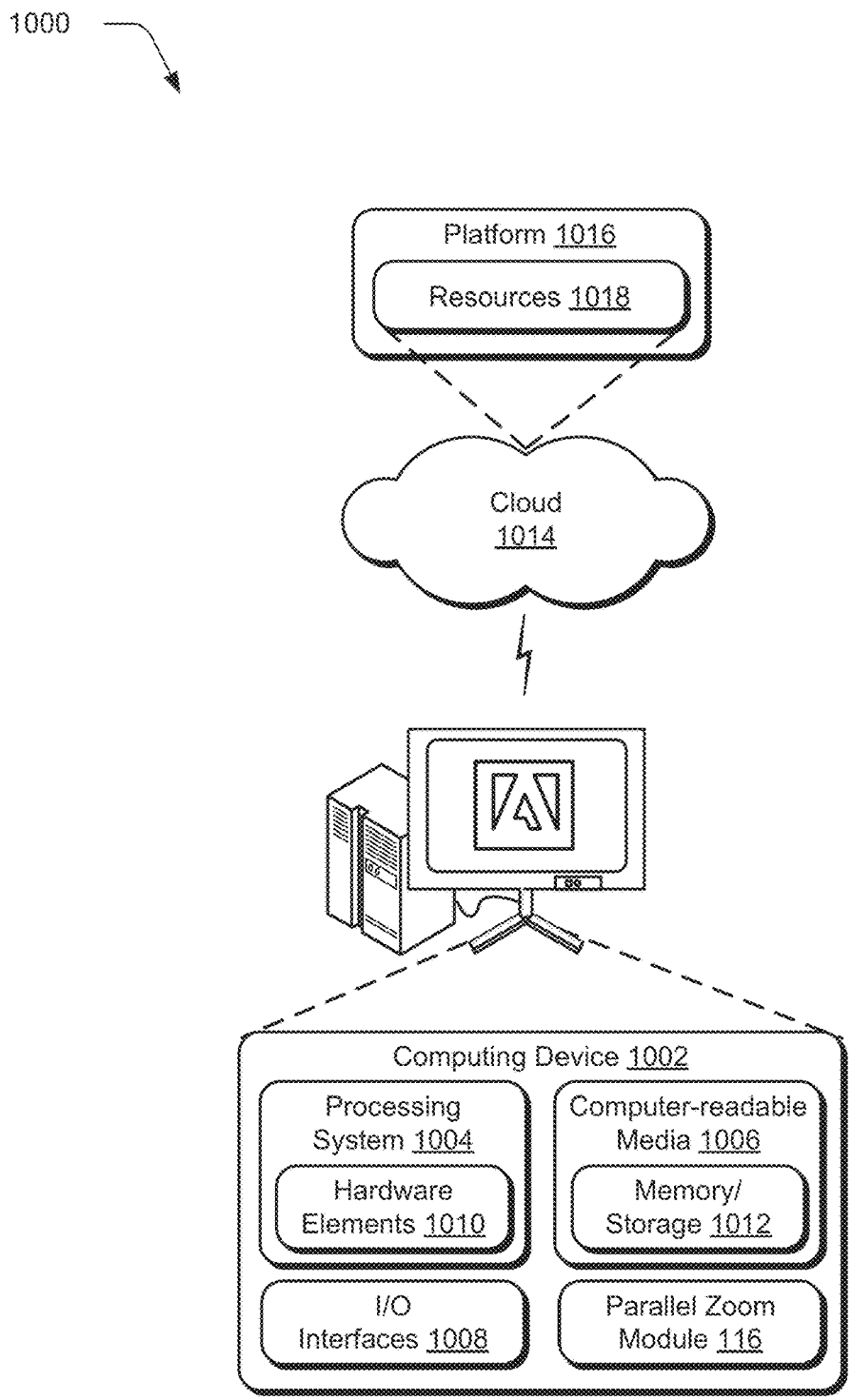
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1100 that includes an example computing device 1002 that is representative of one or more computing systems and/or devices that implement the various techniques described herein. This is illustrated through inclusion of the parallel zoom module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system comprising:
a processing device; and
a computer-readable storage media storing instructions that, responsive to execution by the processing device, causes the processing device to perform operations including:
receiving a zoom input involving a salient object in a digital image in a user interface;

identifying the salient object in the digital image and zoom properties for the salient object based on coordinates of the salient object relative to the digital image;

identifying a corresponding salient object in at least one additional digital image and zoom properties for the corresponding salient object in the at least one additional digital image based on coordinates of the corresponding salient object relative to the at least one additional digital image; and updating the at least one additional digital image, including adjusting the zoom properties for the corresponding salient object in the at least one additional digital image based on the zoom properties for the salient object in the digital image and based on comparing the coordinates of the salient object with the coordinates of the corresponding salient object.

2. The system of claim 1, wherein identifying the corresponding salient object in the at least one additional digital image includes generating a cross-image mapping for salient objects in the digital image and the at least one additional digital image.

3. The system of claim 1, wherein identifying the corresponding salient object in the at least one additional digital image includes assigning a person identification to a face in the digital image and identifying a corresponding face with a matching person identification in the at least one additional digital image.

4. The system of claim 1, wherein identifying the zoom properties for the salient object in the digital image and the corresponding salient object in the at least one additional digital image includes determining an image scale.

5. The system of claim 1, wherein identifying the zoom properties for the salient object in the digital image and the corresponding salient object in the at least one additional digital image includes determining a relative offset within a region of the salient object.

6. The system of claim 5, wherein determining the relative offset within the region of the salient object includes assigning the coordinates to the salient object based on a bounding box.

7. The system of claim 1, wherein identifying the salient object in the digital image and identifying the corresponding salient object in the at least one additional digital image involves identifying a prominent object.

8. The system of claim 1, further comprising updating the zoom properties for the corresponding salient object in the at least one additional digital image based on the zoom properties for the salient object in the digital image and based on an additional user input.

9. The system of claim 1, wherein the digital image and the at least one additional digital image are frames of a video.

10. The system of claim 1, wherein identifying the salient object in the digital image is based on a start-point of a detected zoom gesture input.

11. A method comprising:

identifying, by a processing device, a first object in a first digital image and a scale and a location for the first object in the first digital image in a user interface based on coordinates of the first object relative to the first digital image;

identifying, by the processing device, a second object in a second digital image that corresponds to the first object;

detecting, by the processing device, a scale and a location for the second object in the second digital image based on coordinates of the second object relative to the second digital image;

updating, by the processing device, the second digital image by adjusting the scale and the location for the second object in the second digital image based on the scale and the location for the first object and based on comparing the coordinates of the first object with the coordinates of the second object; and displaying, by the processing device, the second digital image in the user interface based on the updating.

12. The method of claim 11, wherein identifying the second object in the second digital image includes generating a cross-image mapping for objects in the first digital image and the second digital image.

13. The method of claim 11, wherein identifying the second object in the second digital image includes assigning a person identification to a face in the first digital image and identifying a corresponding face with a matching person identification in the second digital image.

14. The method of claim 11, wherein identifying the location for the first object in the first digital image includes identifying a relative offset within a region of the first object in the first digital image.

15. The method of claim 11, wherein detecting the location for the second object in the second digital image includes determining a relative offset within a region of the second object in the second digital image.

16. The method of claim 11, further comprising updating the scale and the location for the second object in the second digital image based on the scale and the location for the first object in the first digital image and based on an additional user input.

17. A non-transitory computer-readable medium storing executable instructions, which when executed by a processing device, cause the processing device to perform operations comprising:

simultaneously zooming corresponding salient objects in a plurality of digital images, the zooming including:

receiving a zoom input, via a user interface, targeting a salient object in a first digital image of the plurality of digital images;

responsive to the receiving the zoom input, identifying zoom properties defining a visible region from the first digital image of the salient object in the user interface based on coordinates of the salient object relative to the first digital image;

identifying a corresponding salient object in a second digital image of the plurality of digital images and coordinates of the corresponding salient object relative to the second digital image;

updating the second digital image, including adjusting the zoom properties of the corresponding salient object based on the zoom properties defining the visible region from the first digital image and based on comparing the coordinates of the salient object with the coordinates of the corresponding salient object; and displaying the corresponding salient object in a visible region from the second digital image using the zoom properties of the corresponding salient object based on the updating.

18. The non-transitory computer-readable medium of claim 17, wherein identifying the salient object in the first digital image and identifying the corresponding salient object in the second digital image involves identifying a prominent object and generating a cross-image mapping for all salient objects in the first digital image and the second digital image.

19. The non-transitory computer-readable medium of claim 17, wherein identifying the zoom properties for the salient object in the first digital image and the corresponding salient object in the second digital image includes determining an image scale and a relative offset within a region of the salient object.

20. The non-transitory computer-readable medium of claim 17, further comprising updating the zoom properties for the corresponding salient object in the second digital image based on the zoom properties for the salient object in the first digital image and based on an additional user input.

* * * * *